US011375399B2

(12) United States Patent
Wang et al.

(10) Patent No.: US 11,375,399 B2
(45) Date of Patent: Jun. 28, 2022

(54) CONTENTION WINDOW ADJUSTMENT FOR MULTIPLE TRANSMIT RECEIVE POINTS

(71) Applicant: QUALCOMM Incorporated, San Diego, CA (US)

(72) Inventors: Hua Wang, Basking Ridge, NJ (US); Xiaoxia Zhang, San Diego, CA (US); Jing Sun, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 16/507,935

(22) Filed: Jul. 10, 2019

(65) Prior Publication Data

US 2021/0014727 A1     Jan. 14, 2021

(51) Int. Cl.
*H04W 28/06*     (2009.01)
*H04B 17/336*     (2015.01)
(Continued)

(52) U.S. Cl.
CPC .......... *H04W 28/06* (2013.01); *H04B 17/336* (2015.01); *H04L 5/0051* (2013.01);
(Continued)

(58) Field of Classification Search
None
See application file for complete search history.

(56) References Cited

U.S. PATENT DOCUMENTS

| 2017/0188387 A1* | 6/2017 | Mukherjee ............ H04L 1/1812 |
| 2019/0230706 A1* | 7/2019 | Li ........................ H04L 5/0037 |

(Continued)

FOREIGN PATENT DOCUMENTS

| EP | 3328143 A1 | 5/2018 |
| EP | 3335512 A1 | 6/2018 |

(Continued)

OTHER PUBLICATIONS

International Search Report and Written Opinion—PCT/US2020/036594—ISA/EPO—dated Nov. 11, 2020.

(Continued)

*Primary Examiner* — Shripal K Khajuria
(74) *Attorney, Agent, or Firm* — Harrity & Harrity, LLP \ Qualcomm

(57) ABSTRACT

Various aspects of the present disclosure generally relate to wireless communication. In some aspects, a first transmit receive point (TRP) may transmit a first physical downlink shared channel (PDSCH) communication to a user equipment (UE), wherein the first PDSCH communication includes a first set of layers for a codeword, and wherein a second set of layers for the codeword are transmitted to the UE in a second PDSCH communication from a second TRP. The first TRP may receive from the UE, acknowledgement or negative acknowledgement (ACK/NACK) information corresponding to the codeword. The first TRP may adjust a contention window size based at least in part on a determination that a condition, associated with the ACK/NACK information, is satisfied. Numerous other aspects are provided.

31 Claims, 10 Drawing Sheets

(51) Int. Cl.
      *H04L 5/00*           (2006.01)
      *H04L 5/10*           (2006.01)
      *H04W 28/02*        (2009.01)
      *H04W 72/14*        (2009.01)

(52) U.S. Cl.
      CPC .............. *H04L 5/0055* (2013.01); *H04L 5/10* (2013.01); *H04W 28/0289* (2013.01); *H04W 72/14* (2013.01)

(56) References Cited

U.S. PATENT DOCUMENTS

2020/0008231 A1\*   1/2020   Vilaipornsawai ...... H04B 7/088
2022/0029754 A1\*   1/2022   Li ........................ H04L 1/1893

FOREIGN PATENT DOCUMENTS

| WO | 2017069798 A1 | 4/2017 |
| WO | 2018141246 A1 | 8/2018 |

OTHER PUBLICATIONS

Partial International Search Report—PCT/US2020/036594—ISA/EPO—dated Sep. 21, 2020.

\* cited by examiner

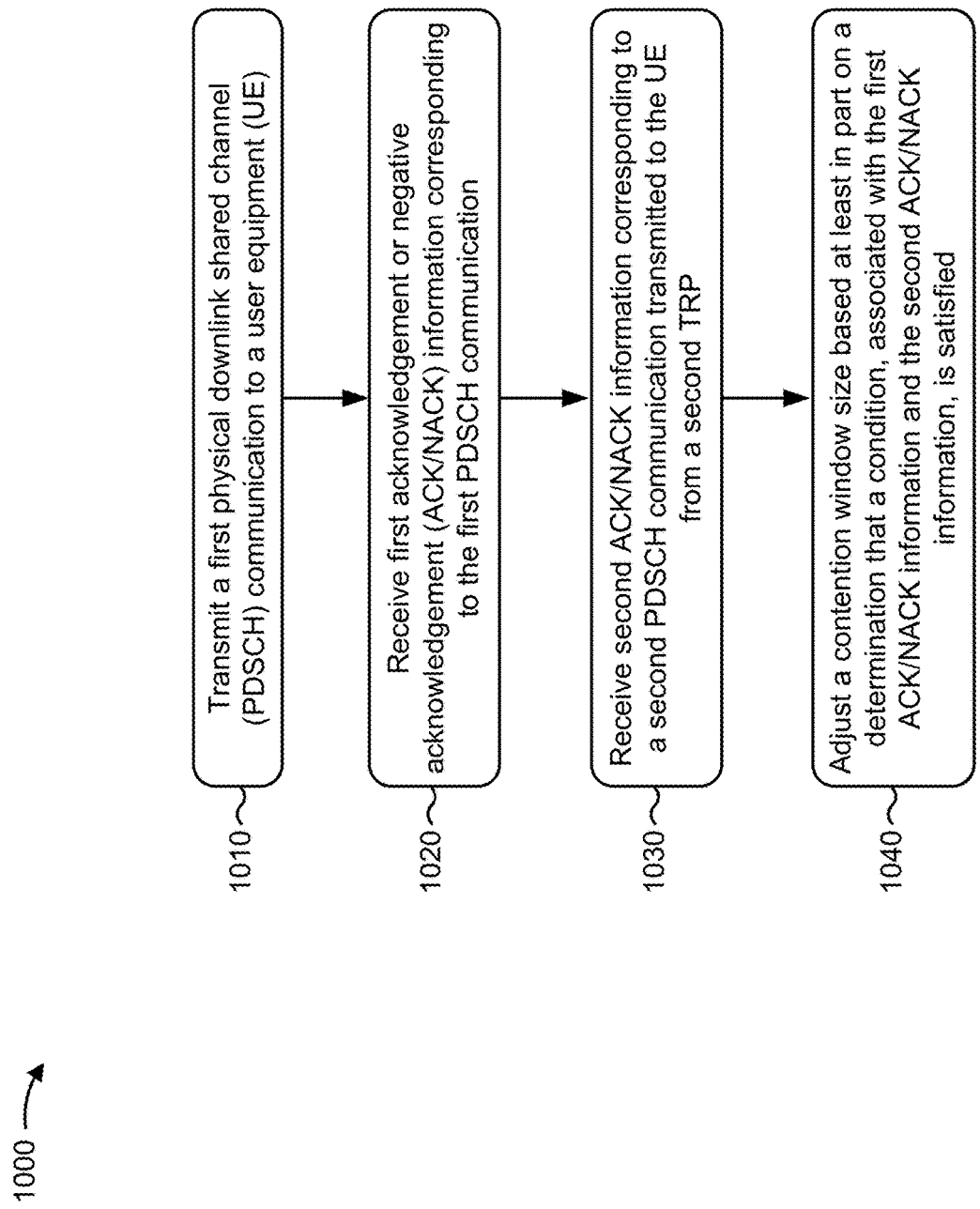

CONTENTION WINDOW ADJUSTMENT FOR MULTIPLE TRANSMIT RECEIVE POINTS

FIELD OF THE DISCLOSURE

Aspects of the present disclosure generally relate to wireless communication and to techniques and apparatuses for contention window adjustment for multiple transmit receive points.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method of wireless communication, performed by a first transmit receive point (TRP), may include transmitting a first physical downlink shared channel (PDSCH) communication to a user equipment (UE), wherein the first PDSCH communication includes a first set of layers for a codeword, and wherein a second set of layers for the codeword are transmitted to the UE in a second PDSCH communication from a second TRP; receiving, from the UE, acknowledgement or negative acknowledgement (ACK/NACK) information corresponding to the codeword; and adjusting a contention window size based at least in part on a determination that a condition, associated with the ACK/NACK information, is satisfied.

In some aspects, a method of wireless communication, performed by a UE, may include determining that a first PDSCH communication from a first TRP was not successfully received by the UE, wherein the first PDSCH communication from the first TRP includes a first set of layers for a codeword and a second PDSCH communication from a second TRP includes a second set of layers for the codeword; and transmitting ACK/NACK information corresponding to the codeword to both the first TRP and the second TRP based at least in part on determining that the first PDSCH communication was not successfully received by the UE.

In some aspects, a method of wireless communication, performed by a first TRP, may include transmitting a first PDSCH communication to a UE; receiving, from the UE, first ACK/NACK information corresponding to the first PDSCH communication; receiving second ACK/NACK information corresponding to a second PDSCH communication transmitted to the UE from a second TRP; and adjusting a contention window size based at least in part on a determination that a condition, associated with the first ACK/NACK information and the second ACK/NACK information, is satisfied.

In some aspects, a first TRP for wireless communication may include memory and one or more processors operatively coupled to the memory. The memory and the one or more processors may be configured to transmit a first PDSCH communication to a UE, wherein the first PDSCH communication includes a first set of layers for a codeword, and wherein a second set of layers for the codeword are transmitted in a second PDSCH communication from a second TRP; receive, from the UE, ACK/NACK information corresponding to the codeword; and adjust a contention window size based at least in part on a determination that a condition, associated with the ACK/NACK information, is satisfied.

In some aspects, a UE for wireless communication may include memory and one or more processors operatively coupled to the memory. The memory and the one or more processors may be configured to determine that a first PDSCH communication from a first TRP was not successfully received by the UE, wherein the first PDSCH communication from the first TRP includes a first set of layers for a codeword and a second PDSCH communication from a second TRP includes a second set of layers for the codeword; and transmit ACK/NACK information corresponding to the codeword to both the first TRP and the second TRP based at least in part on determining that the first PDSCH communication was not successfully received by the UE.

In some aspects, a first TRP for wireless communication may include memory and one or more processors operatively coupled to the memory. The memory and the one or more processors may be configured to transmit a first PDSCH communication to a UE; receive, from the UE, first ACK/NACK information corresponding to the first PDSCH communication; receive second ACK/NACK information corresponding to a second PDSCH communication transmitted to the UE from a second TRP; and adjust a contention window size based at least in part on a determination that a condition, associated with the first ACK/NACK information and the second ACK/NACK information, is satisfied.

In some aspects, a non-transitory computer-readable medium may store one or more instructions for wireless communication. The one or more instructions, when executed by one or more processors of a first TRP, may cause the one or more processors to transmit a first PDSCH communication to a UE, wherein the first PDSCH communication includes a first set of layers for a codeword, and wherein a second set of layers for the codeword are transmitted in a second PDSCH communication from a second TRP; receive, from the UE, ACK/NACK information corresponding to the codeword; and adjust a contention window size based at least in part on a determination that a condition, associated with the ACK/NACK information, is satisfied.

In some aspects, a non-transitory computer-readable medium may store one or more instructions for wireless communication. The one or more instructions, when executed by one or more processors of a UE, may cause the one or more processors to determine that a first PDSCH communication from a first TRP was not successfully received by the UE, wherein the first PDSCH communication from the first TRP includes a first set of layers for a codeword and a second PDSCH communication from a second TRP includes a second set of layers for the codeword; and transmit ACK/NACK information corresponding to the codeword to both the first TRP and the second TRP based at least in part on determining that the first PDSCH communication was not successfully received by the UE.

In some aspects, a non-transitory computer-readable medium may store one or more instructions for wireless communication. The one or more instructions, when executed by one or more processors of a first TRP, may cause the one or more processors to transmit a first PDSCH communication to a UE; receive, from the UE, first ACK/NACK information corresponding to the first PDSCH communication; receive second ACK/NACK information corresponding to a second PDSCH communication transmitted to the UE from a second TRP; and adjust a contention window size based at least in part on a determination that a condition, associated with the first ACK/NACK information and the second ACK/NACK information, is satisfied.

In some aspects, a first TRP (e.g., an apparatus) for wireless communication may include means for transmitting a first PDSCH communication to a UE, wherein the first PDSCH communication includes a first set of layers for a codeword, and wherein a second set of layers for the codeword are transmitted to the UE in a second PDSCH communication from a second TRP; means for receiving, from the UE, ACK/NACK information corresponding to the codeword; and means for adjusting a contention window size based at least in part on a determination that a condition, associated with the ACK/NACK information, is satisfied.

In some aspects, a UE (e.g., an apparatus) for wireless communication may include means for determining that a first PDSCH communication from a first TRP was not successfully received by the UE, wherein the first PDSCH communication from the first TRP includes a first set of layers for a codeword and a second PDSCH communication from a second TRP includes a second set of layers for the codeword; and means for transmitting ACK/NACK information corresponding to the codeword to both the first TRP and the second TRP based at least in part on determining that the first PDSCH communication was not successfully received by the UE.

In some aspects, a first TRP (e.g., an apparatus) for wireless communication may include means for transmitting a first PDSCH communication to a UE; means for receiving, from the UE, first ACK/NACK information corresponding to the first PDSCH communication; means for receiving second ACK/NACK information corresponding to a second PDSCH communication transmitted to the UE from a second TRP; and means for adjusting a contention window size based at least in part on a determination that a condition, associated with the first ACK/NACK information and the second ACK/NACK information, is satisfied.

Aspects generally include a method, apparatus, system, computer program product, non-transitory computer-readable medium, user equipment, base station, wireless communication device, transmit receive point, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 10 is a diagram illustrating an example process performed, for example, by a transmit receive point, in accordance with various aspects of the present disclosure.

DETAILED DESCRIPTION

Figure 1:
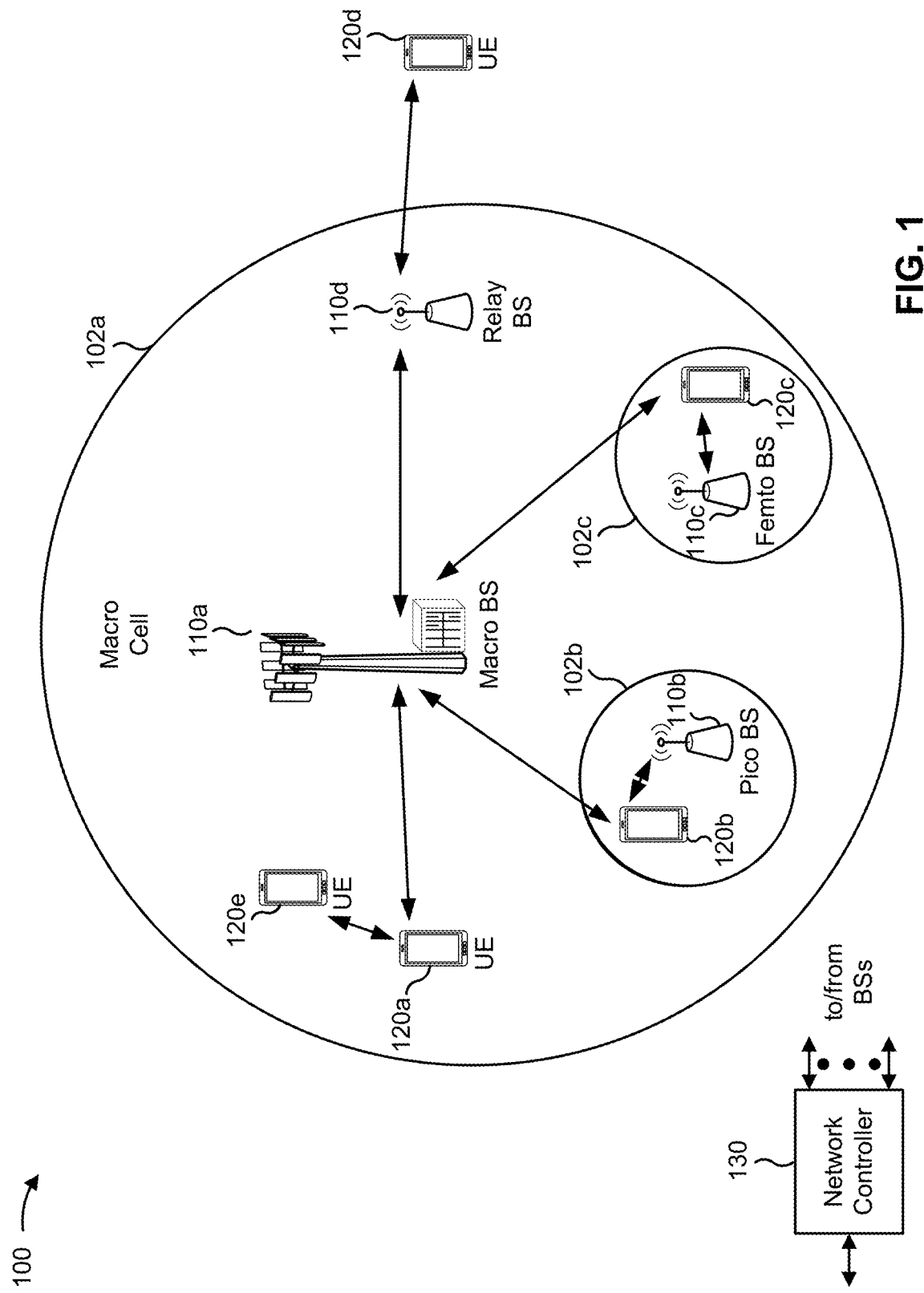
FIG. 1 is a block diagram conceptually illustrating an example of a wireless communication network, in accordance with various aspects of the present disclosure.

In a multi-transmit receive point (multi-TRP) scenario, different TRPs may use different contention windows for congestion control, and there may be multiple mechanisms for acknowledgement or negative acknowledgement (ACK/NACK) information. For example, a UE may transmit ACK/NACK information for a physical downlink shared channel (PDSCH) communication to only the TRP from which the PDSCH communication was received, may transmit ACK/NACK information for a PDSCH communication to a TRP that did not transmit the PDSCH communication, may transmit ACK/NACK information to multiple TRPs, and/or the like. In a multi-TRP scenario, a first TRP may adjust (or fail to adjust) a contention window in a sub-optimal manner if the first TRP uses only ACK/NACK information for PDSCH communications transmitted by the first TRP without accounting for ACK/NACK information for PDSCH communications transmitted by a second TRP. Some techniques and apparatuses described herein permit improved contention window adjustment using information from multiple TRPs.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
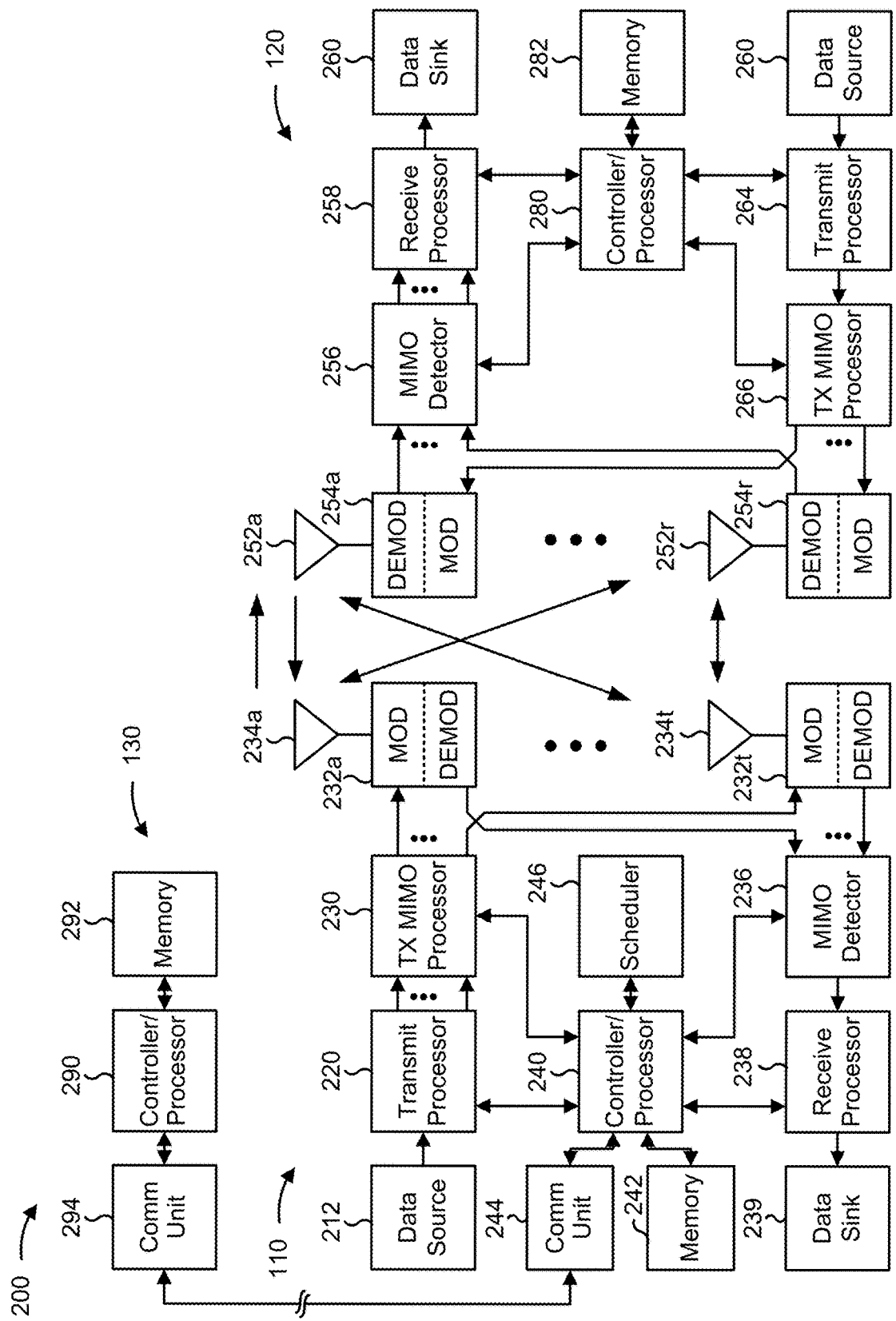
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with contention window adjustment for multiple transmit receive points, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

Figure 8:
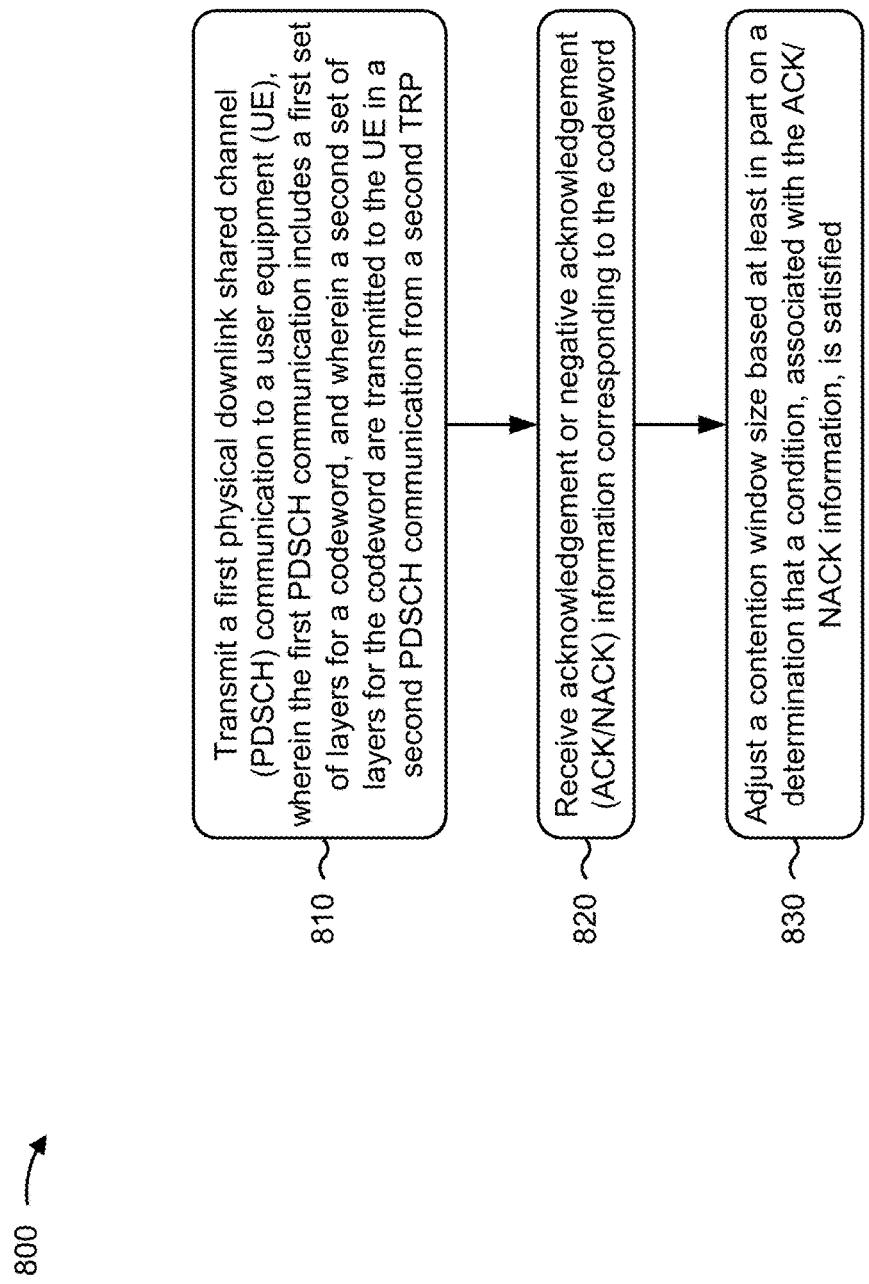
FIG. 8 is a diagram illustrating an example process performed, for example, by a transmit receive point, in accordance with various aspects of the present disclosure.
Figure 9:
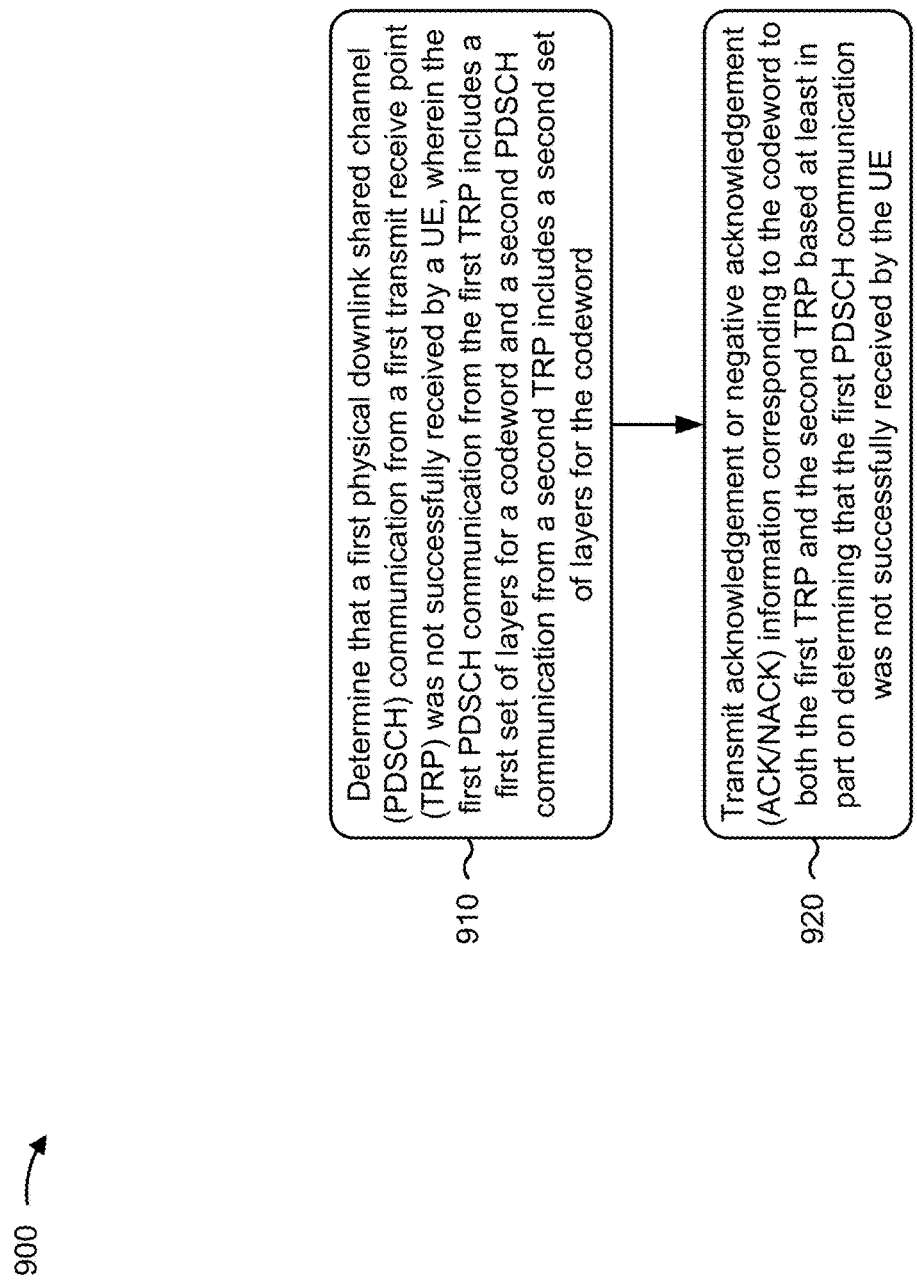
FIG. 9 is a diagram illustrating an example process performed, for example, by a user equipment, in accordance with various aspects of the present disclosure.

The stored program codes, when executed by processor 280 and/or other processors and modules at UE 120, may cause the UE 120 to perform operations described with respect to process 900 of FIG. 9 and/or other processes as described herein. The stored program codes, when executed by processor 240 and/or other processors and modules at base station 110, may cause the base station 110 to perform operations described with respect to process 800 of FIG. 8, process 1000 of FIG. 10, and/or other processes as described herein. A scheduler 246 may schedule UEs for data transmission on the downlink and/or uplink.

In some aspects, a UE 120 may include means for determining that a first physical downlink shared channel (PDSCH) communication from a first transmit receive point (TRP) was not successfully received by the UE, wherein the first PDSCH communication from the first TRP includes a first set of layers for a codeword and a second PDSCH communication from a second TRP includes a second set of layers for the codeword; means for transmitting acknowledgement or negative acknowledgement (ACK/NACK) information corresponding to the codeword to both the first TRP and the second TRP based at least in part on determining that the first PDSCH communication was not successfully received by the UE; and/or the like. In some aspects, such means may include one or more components of UE 120 described in connection with FIG. 2.

In some aspects, a first TRP (e.g., base station 110) may include means for transmitting a first PDSCH communication to a UE, wherein the first PDSCH communication includes a first set of layers for a codeword, and wherein a second set of layers for the codeword are transmitted to the UE in a second PDSCH communication from a second TRP; means for receiving, from the UE, ACK/NACK information corresponding to the codeword; means for adjusting a contention window size based at least in part on a determination that a condition, associated with the ACK/NACK information, is satisfied; and/or the like. Additionally, or alternatively, the first TRP may include means for transmitting a first PDSCH communication to a UE; means for receiving, from the UE, first ACK/NACK information corresponding to the first PDSCH communication; means for receiving second ACK/NACK information corresponding to a second PDSCH communication transmitted to the UE from a second TRP; means for adjusting a contention window size based at least in part on a determination that a condition, associated with the first ACK/NACK information and the second ACK/NACK information, is satisfied; and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3:
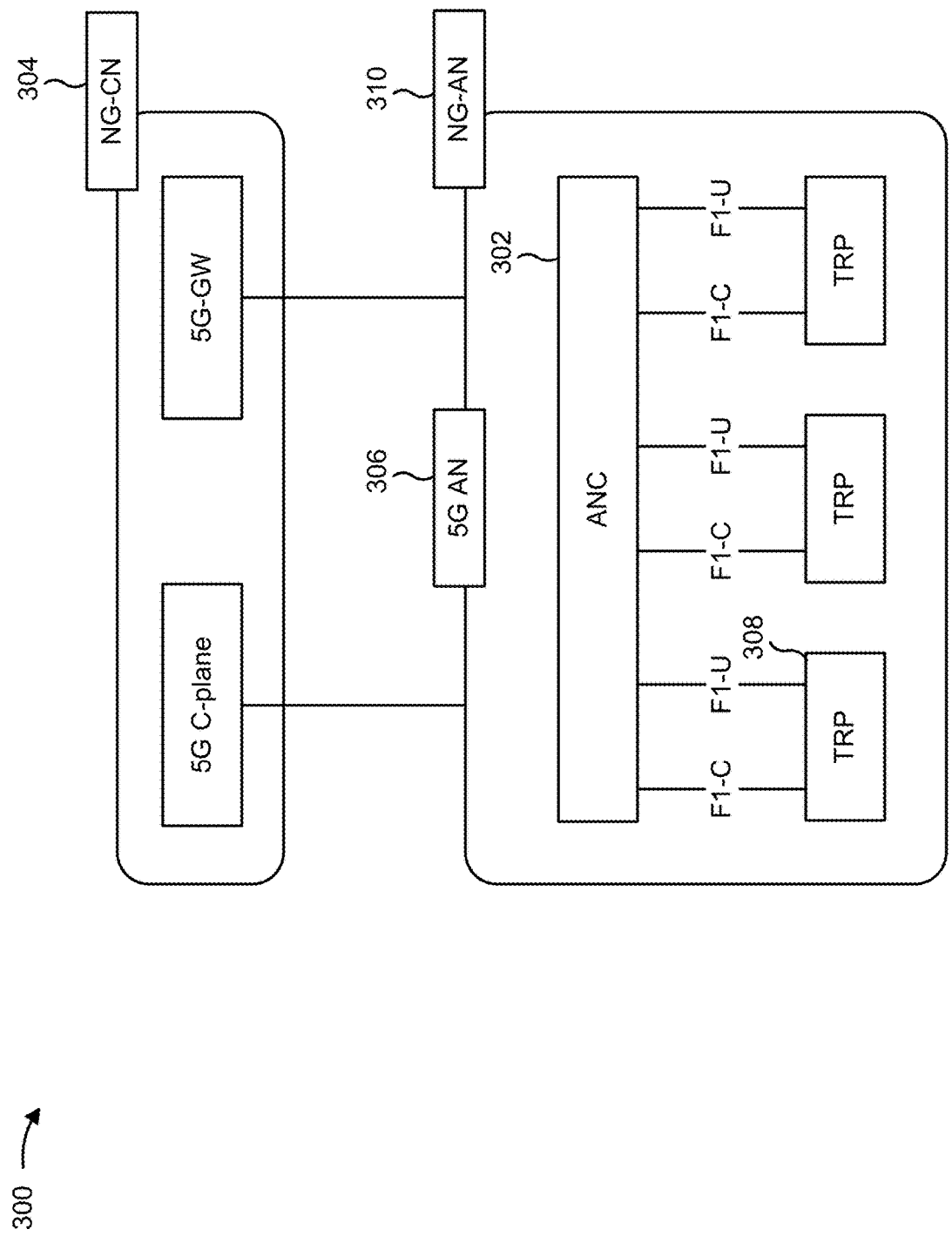
FIG. 3 illustrates an example logical architecture of a distributed radio access network (RAN), in accordance with various aspects of the present disclosure.

FIG. 3 illustrates an example logical architecture of a distributed RAN 300, according to aspects of the present disclosure.

A 5G access node 306 may include an access node controller (ANC) 302. The ANC 302 may be a central unit (CU) of the distributed RAN 300. The backhaul interface to the next generation core network (NG-CN) 304 may terminate at the ANC 302. The backhaul interface to neighboring next generation access nodes (NG-ANs) may terminate at the ANC 302. The ANC 302 may include one or more TRPs 308 (which may also be referred to as BSs, NR BSs, Node Bs, 5G NBs, APs, gNB, or some other term). A TRP 308 may be used interchangeably with "cell" and/or "panel." In some aspects, multiple TRPs 308 may be included in a single base station 110. Additionally, or alternatively, different TRPs 308 may be included in different base stations 110.

A TRP 308 may be a distributed unit (DU). A TRP 308 may be connected to a single ANC 302 or multiple ANCs 302. For example, for RAN sharing, radio as a service (RaaS), and service specific AND deployments, the TRP 308 may be connected to more than one ANC 302. A TRP 308 may include one or more antenna ports. The TRPs 308 may be configured to individually (e.g., using dynamic selection) or jointly (e.g., using joint transmission) serve traffic to a UE 120.

In some aspects, multiple TRPs 308 may transmit communications (e.g., the same communication or different communications) in the same TTI or different TTIs (e.g., slots, mini-slots, and/or the like) using different QCL relationships (e.g., different spatial parameters, different transmission configuration indicator (TCI) states, different precoding parameters, different beamforming parameters, and/or the like).

The local architecture of RAN 300 may be used to illustrate fronthaul definition. The architecture may be defined to support fronthauling solutions across different deployment types. For example, the architecture may be based at least in part on transmit network capabilities (e.g., bandwidth, latency, and/or jitter). The architecture may share features and/or components with LTE. According to aspects, the next generation AN (NG-AN) 310 may support dual connectivity with NR. The NG-AN 310 may share a common fronthaul for LTE and NR. The architecture may enable cooperation between and among TRPs 308. For example, cooperation may be preset within a TRP 308 and/or across TRPs 308 via the ANC 302. In some aspects, no inter-TRP interface may be needed/present.

In some aspects, a dynamic configuration of split logical functions may be present within the architecture of RAN 300. The packet data convergence protocol (PDCP), radio link control (RLC), media access control (MAC) protocol, and/or the like may be adaptably placed at the ANC 302 or TRP 308. According to various aspects, a base station 110 may include a central unit (CU) (e.g., ANC 302) and/or one or more distributed units (e.g., one or more TRPs 308).

As indicated above, FIG. 3 is provided merely as an example. Other examples may differ from what was described with regard to FIG. 3.

Figure 4:
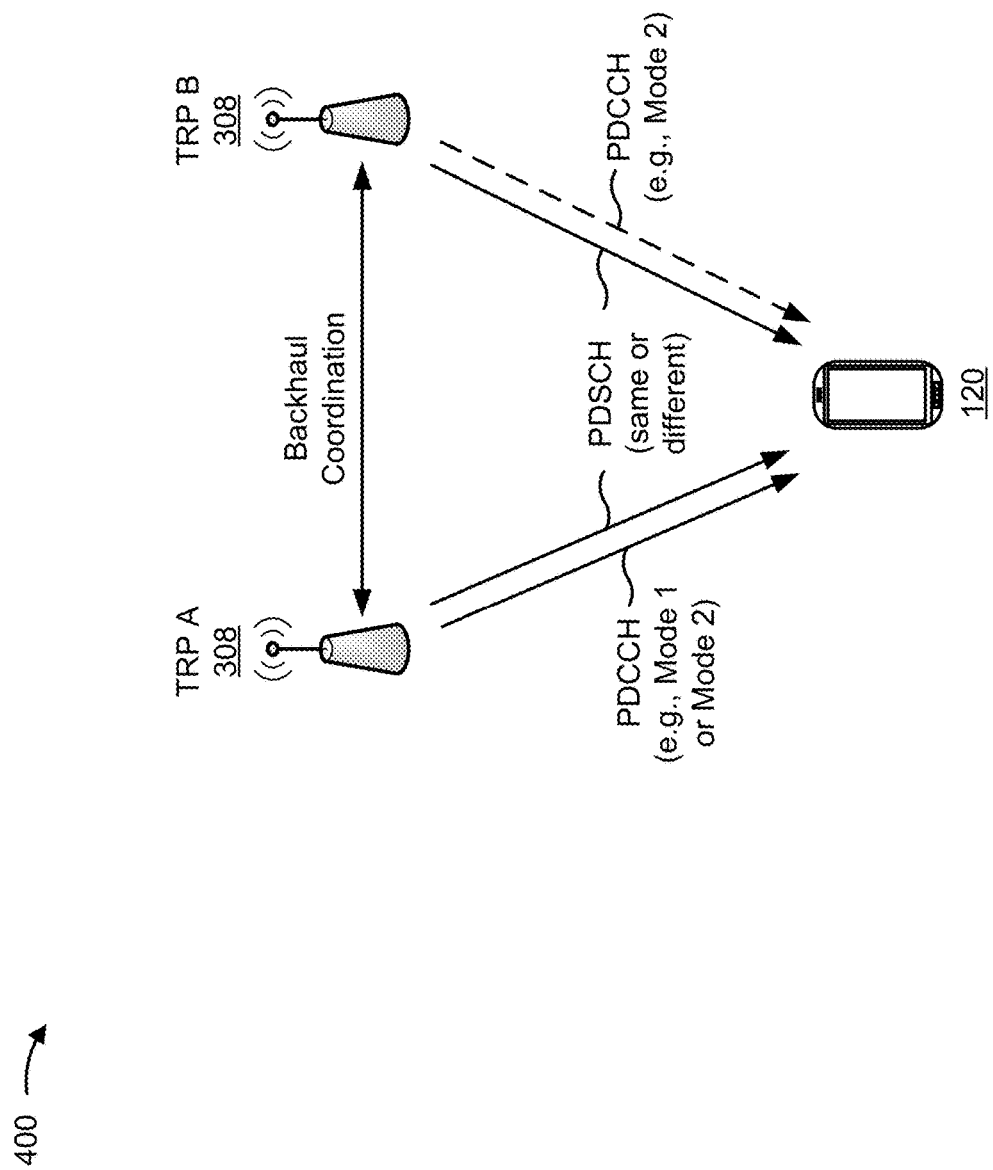
FIG. 4 is a diagram illustrating an example of multi-TRP communication, in accordance with various aspects of the present disclosure.

FIG. 4 is a diagram illustrating an example 400 of multi-TRP communication (sometimes referred to as multi-panel communication), in accordance with various aspects of the present disclosure.

As shown in FIG. 4, multiple TRPs 308 (shown as TRP A and TRP B) may communicate with the same UE 120 in a coordinated manner (e.g., using coordinated multipoint transmissions and/or the like) to improve reliability, increase throughput, and/or the like. The TRPs 308 may coordinate such communications via a backhaul, which may have a smaller delay and/or higher capacity when the TRPs 308 are co-located at the same base station 110 (e.g., different antenna arrays of the same base station 110), or may have a larger delay and/or lower capacity (as compared to co-location) when the TRPs 308 are located at different base stations 110. The different TRPs 308 may communicate with the UE 120 using different QCL relationships, different demodulation reference signal (DMRS) ports, different layers (e.g., of a multi-layer communication), and/or the like.

In a first multi-TRP transmission mode (e.g., Mode 1), a single physical downlink control channel (PDCCH) may be used to schedule downlink data communications for a single physical downlink shared channel (PDSCH). In this case, multiple TRPs 308 (e.g., TRP A and TRP B) may transmit communications to the UE 120 on the same PDSCH. For example, a communication may be transmitted using a single codeword with different spatial layers for different TRPs 308 (e.g., where one codeword maps to a first set of layers transmitted by a first TRP 308 and maps to a second set of layers transmitted by a second TRP 308). As another example, a communication may be transmitted using multiple codewords, where different codewords are transmitted by different TRPs 308 (e.g., using different sets of layers). In either case, different TRPs 308 may use different QCL relationships for different DMRS ports corresponding to different layers. For example, a first TRP 308 may use a first QCL relationship for a first set of DMRS ports corresponding to a first set of layers, and a second TRP 308 may use a second (different) QCL relationship for a second (different) set of DMRS ports corresponding to a second (different) set of layers. In some aspects, a TCI state in downlink control information (DCI) (e.g., transmitted on the PDCCH, such as DCI format 1_0, DCI format 1_1, and/or the like) may indicate the first QCL relationship and the second QCL relationship.

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 308, and a second PDCCH may schedule a second codeword to be transmitted by a second TRP 308. Furthermore, first DCI (e.g., transmitted by the first TRP 308) may schedule a first PDSCH communication associated with a first set of DMRS ports with a first QCL relationship for the first TRP 308, and second DCI (e.g., transmitted by the second TRP 308) may schedule a second PDSCH communication associated with a second set of DMRS ports with a second QCL relationship for the second TRP 308. In this case, DCI (e.g., having DCI format 1_0, DCI format 1_1, and/or the like) may indicate a corresponding TCI state for a TRP 308 corresponding to the DCI.

In a multi-TRP communication scenario, performance may be improved by enabling the UE 120 to identify a TRP 308 from which a communication was received. For example, if the UE 120 can identify the TRP 308 that transmitted a communication, then the UE 120 can transmit TRP-specific acknowledgement (ACK) or negative acknowledgement (NACK) (ACK/NACK) information for the communication to the identified TRP 308. This may conserve network resources, UE resources (e.g., memory resources, processing resources, battery power, and/or the like), base station and/or TRP resources (e.g., memory resources, processing resources, and/or the like), and/or the like that would otherwise be used to transmit ACK/NACK information to multiple TRPs 308 and/or receive the ACK/NACK information at multiple TRPs 308. Additionally, or alternatively, the UE 120 may be configured to operate in a mode where ACK/NACK information is sent to multiple TRPs 308 (e.g., based at least in part on an ability of the UE 120 to identify the TRPs 308 to which the ACK/NACK information is to be sent), which may improve reliability. Additionally, or alternatively, if the UE 120 can identify a TRP 308, then the UE 120 may be capable of detecting and/or reporting errors associated with a TRP 308.

As indicated above, FIG. 4 is provided as an example. Other examples may differ from what is described with respect to FIG. 4.

Figure 5:
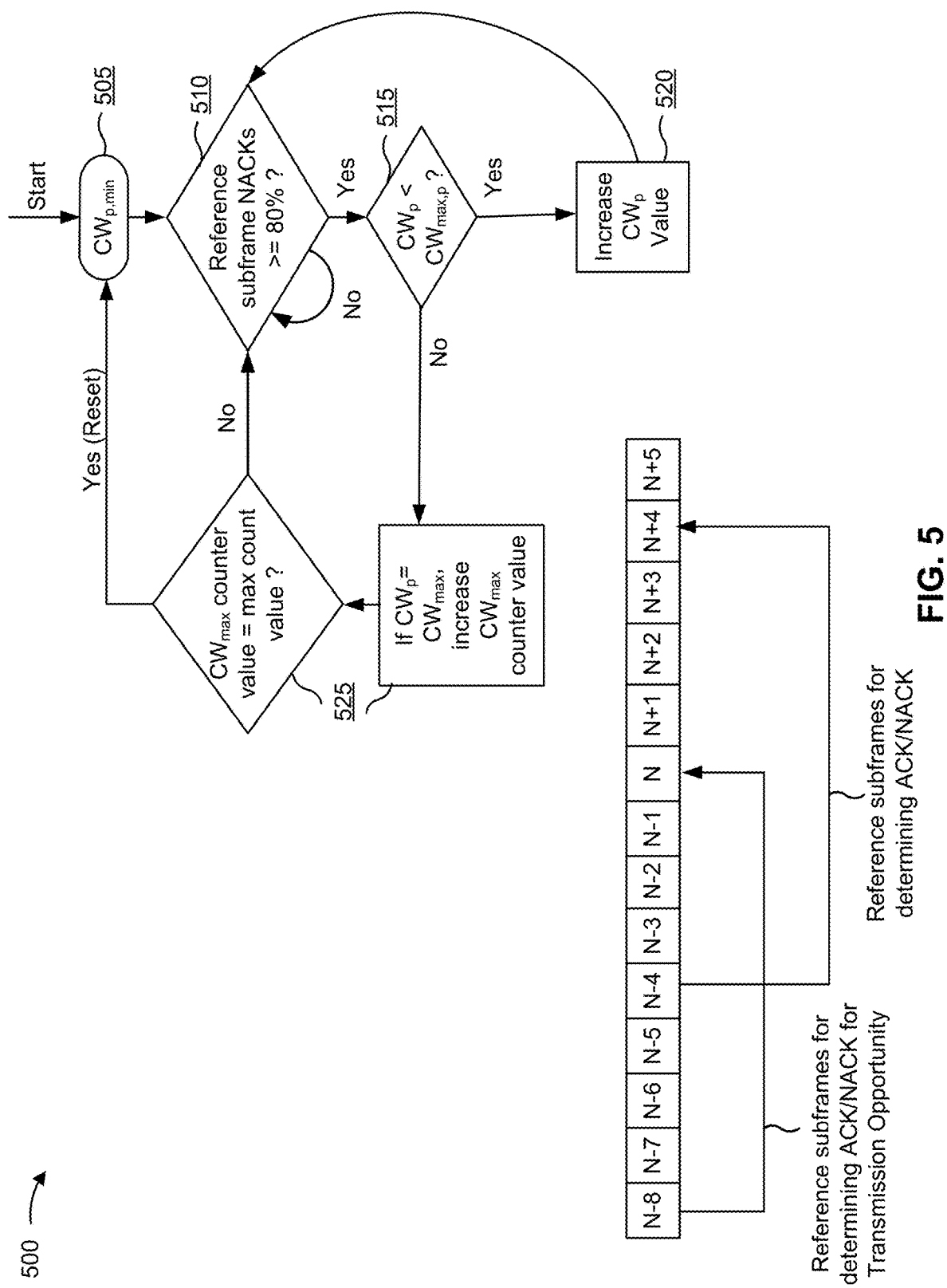
FIG. 5 is a diagram illustrating an example of a contention window adjustment procedure, in accordance with various aspects of the present disclosure.

FIG. 5 is a diagram illustrating an example 500 of a contention window adjustment procedure, in accordance with various aspects of the present disclosure.

In wireless communication systems where devices (e.g., UEs, Wi-Fi nodes, and/or the like) contend for access to a network, a contention window may be used for congestion control and to avoid collisions. For example, a contention window may be used for licensed-assisted access (LAA) to an unlicensed spectrum. UEs 120 and other devices may contend for access to the network using a listen-before-talk (LBT) procedure in the contention window. A size of the contention window can be increased when there is more network traffic (e.g., congestion) to permit more opportunities for devices to gain access to the network. An access point (e.g., a base station, a TRP, and/or the like) may analyze acknowledgement (ACK) or negative acknowledgement (NACK) (ACK/NACK) information received during a reference time window (e.g., a reference subframe, a set of reference subframes, a reference slot, a set of reference slots, and/or the like), and may adjust the size of the contention window based at least in part on the ACK/NACK information. For example, if a threshold percentage of the ACK/NACK information received in the reference time window are NACKs, then the access point may increase the size of the contention window to mitigate congestion. In some aspects, ACK/NACK information may include hybrid automatic repeat request (HARQ) acknowledgement (HARQ-ACK) information.

Referring to FIG. 5, at block 505, an access point may initialize a contention window (CW) for a particular LBT priority class ($CW_p$) with a minimum size for the contention window ($CW_{p,min}$ or $CW_{min,p}$). At block 510, the access point may analyze ACK/NACK information received in a reference time window. For example, the access point may count a number of ACKs received in the reference time window, a number of NACKs received in the reference time window, and/or a total number of ACKs plus NACKs received in the reference time window. The access point may determine whether a percentage of NACKs received in the reference time window, relative to the total number of ACKs plus NACKs received in the reference time window, satisfies a threshold (e.g., is greater than or equal to 80%). If the percentage of NACKs does not satisfy the threshold, then the access point may maintain the size of the contention window, and may wait for the next reference time window to analyze subsequent ACK/NACK information. In some aspects, the reference time window may be, and/or may start at, a starting subframe of a most recent transmission by the access point for which ACK/NACK information is expected to be received.

If the percentage of NACKs satisfies the threshold, then the access point may determine whether the contention window is a maximum size ($CW_{p,max}$ or $CW_{max,p}$) at block 515. If the contention window has not reached a maximum size, then the access point may increase a size of the contention window at block 520, to assist with congestion control and to permit more devices to access the network, transmit communications over the network, and/or receive communications over the network. For example, if at least 80% of ACK/NACK values corresponding to PDSCH transmissions in a reference time window k are determined to be NACK values, then the access point may increase the size of the contention window (e.g., for one or more LBT priority classes) to a next higher allowed value (e.g., if the contention window has not yet reached a maximum size). The access point may then wait for the next reference time window to analyze subsequent ACK/NACK information. If the contention window has reached a maximum size, then the access point may perform a procedure at blocks 525 to determine whether to reset the contention window to the minimum size.

However, in a multi-TRP scenario (e.g., as described above in connection with FIG. 4), different TRPs may use different contention windows and there may be multiple mechanisms for ACK/NACK information. For example, a UE may transmit ACK/NACK information for a PDSCH communication to only the TRP from which the PDSCH communication was received, may transmit ACK/NACK information for a PDSCH communication to a TRP that did not transmit the PDSCH communication, may transmit ACK/NACK information to multiple TRPs, and/or the like. In a multi-TRP scenario, a first TRP may adjust (or fail to adjust) a contention window in a sub-optimal manner if the first TRP uses only ACK/NACK information for PDSCH communications transmitted by the first TRP without accounting for ACK/NACK information for PDSCH communications transmitted by a second TRP. Some techniques and apparatuses described herein permit improved contention window adjustment using information from multiple TRPs.

As indicated above, FIG. 5 is provided as an example. Other examples may differ from what is described with respect to FIG. 5.

Figure 6:
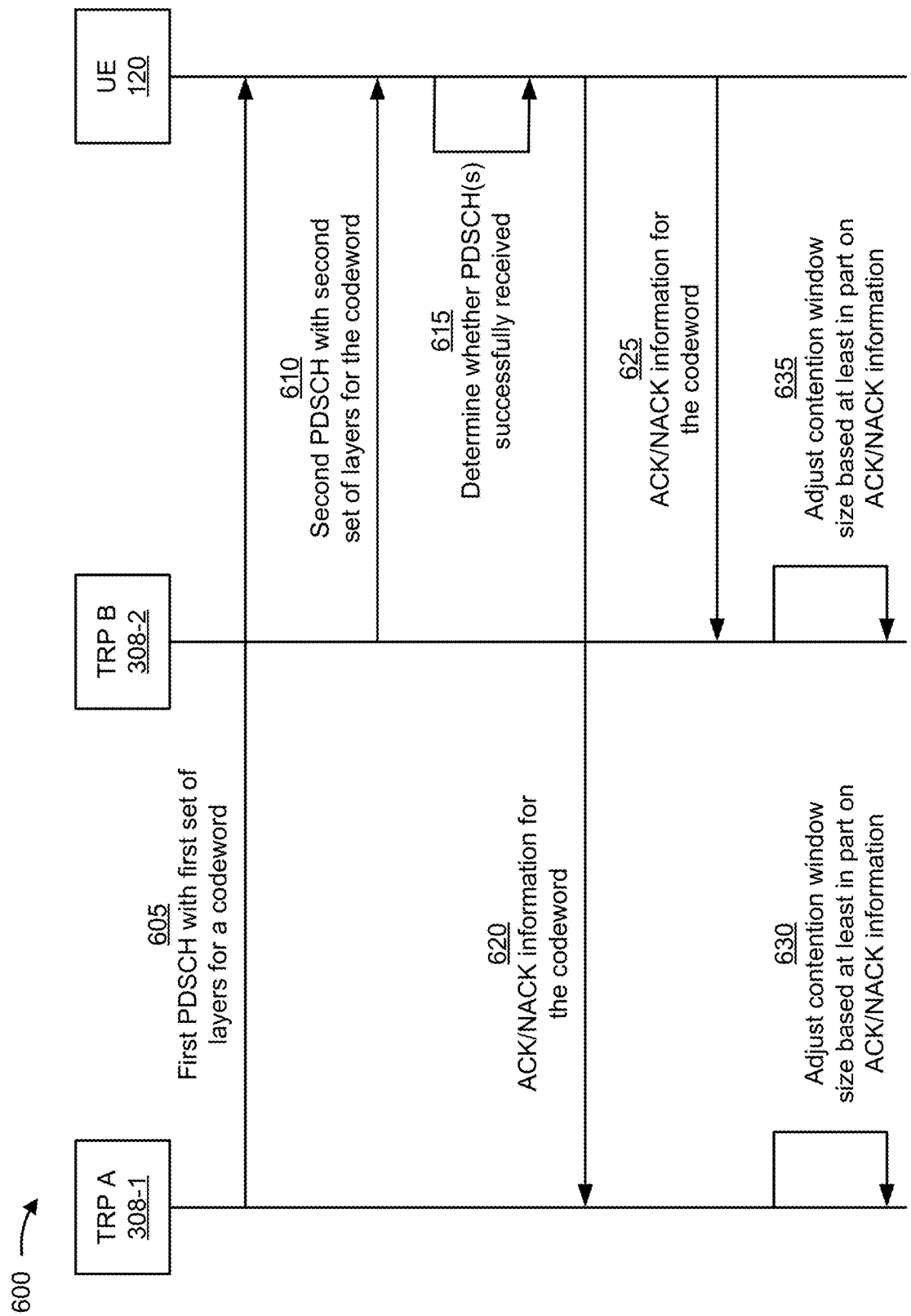
FIG. 6 is a diagram illustrating an example of contention window adjustment for multiple transmit receive points, in accordance with various aspects of the present disclosure.

FIG. 6 is a diagram illustrating an example 600 of contention window adjustment for multiple transmit receive points, in accordance with various aspects of the present disclosure. As shown in FIG. 6, a UE 120 may communicate with a first TRP 308-1 (shown as TRP A) and a second TRP 308-2 (shown as TRP B). One or both of the first TRP 308-1 and the second TRP 308-2 may be a TRP 308 described above in connection with FIG. 3 and/or may be deployed in a base station 110 described above in connection with FIG. 1 (e.g., the same base station 110 or different base stations 110).

As shown by reference number 605, TRP A may transmit a first PDSCH communication to the UE 120. The first PDSCH communication may include a first set of layers for a codeword (e.g., a single layer for the codeword or multiple layers for the codeword). As shown by reference number 610, TRP B may transmit a second PDSCH communication to the UE 120. The second PDSCH communication may include a second set of layers for the codeword (e.g., a single layer for the codeword or multiple layers for the codeword). The second set of layers is different from the first set of layers. For example, TRP A and TRP B may communicate with the UE 120 in a first multi-TRP transmission mode (e.g., Mode 1), where a single PDCCH is used to schedule downlink data communications for a single PDSCH. In this case, TRP A and TRP B may transmit communications to the UE 120 on the same PDSCH. In example 600, TRP A and TRP B transmit respective PDSCH communications using a single codeword with different spatial layers for the different TRPs (e.g., where one codeword maps to a first set of layers transmitted by TRP A and maps to a second set of layers transmitted by TRP B).

As shown by reference number 615, the UE 120 may determine whether the PDSCH communications were successfully received. For example, the UE 120 may determine whether the first PDSCH communication and/or the second PDSCH communication were successfully received. In example 600, because the first and second PDSCH communications map to the same codeword and ACK/NACK information is determined and transmitted on a per-codeword basis (e.g., a single ACK/NACK is generated and transmitted per codeword), the UE 120 may determine joint ACK/NACK information corresponding to the codeword transmitted using the first and second PDSCH communications. In this case, if the UE 120 successfully receives and/or decodes both the first PDSCH communication and the second PDSCH communication, then the UE 120 may generate and transmit an ACK in the ACK/NACK information. If the UE 120 does not successfully receive and/or decode one of the first PDSCH communication or the second PDSCH communication (e.g., if one or both of the PDSCH communications fail), then the UE 120 may generate and transmit a NACK in the ACK/NACK information.

As shown by reference number 620, the UE 120 may transmit ACK/NACK information corresponding to the codeword to TRP A. Similarly, as shown by reference number 625, the UE 120 may transmit ACK/NACK information (e.g., the same ACK/NACK information) corresponding to the codeword to TRP B. Thus, the UE 120 may transmit ACK/NACK information (e.g., the same ACK/NACK information, or joint ACK/NACK information as described above) to both TRP A and TRP B. In this case, if the UE 120 successfully receives and/or decodes both the first PDSCH communication and the second PDSCH communication, then the UE 120 may transmit an ACK to both TRP A and TRP B. If the UE 120 does not successfully receive and/or decode one of the first PDSCH communication or the second PDSCH communication (e.g., if one or both of the PDSCH communications fail), then the UE 120 may transmit a NACK to both TRP A and TRP B (e.g., even if one of the PDSCH communications is successfully received).

As shown by reference number 630, TRP A may adjust a contention window size based at least in part on the ACK/NACK information (e.g., the joint ACK/NACK information corresponding to the codeword). For example, TRP A may adjust the contention window size based at least in part on a determination that a condition, associated with the ACK/NACK information, is satisfied. Similarly, as shown by reference number 635, TRP B may adjust a contention window size based at least in part on the ACK/NACK information (e.g., the joint ACK/NACK information corresponding to the codeword). For example, TRP B may adjust the contention window size based at least in part on a determination that a condition, associated with the ACK/NACK information, is satisfied. The contention window may be associated with an LAA procedure, as described above in connection with FIG. 5.

In some aspects, each TRP may use independent contention windows. For example, different TRPs may use different contention windows. The different contention windows used by different TRPs may potentially have different sizes because each TRP may independently control, configure, and/or adjust a size of the contention window for that TRP. For example, if a first TRP is associated with high congestion and a second TRP is associated with low congestion, then the first TRP may configure a first contention window of the first TRP to have a larger size as compared to a second contention window of the second TRP. As described above in connection with FIG. 5, a contention window size may be adjusted based at least in part on NACKs (e.g., a percentage of NACKs received in a reference time window).

However, in example 600, where joint ACK/NACK information corresponds to a single codeword transmitted by TRP A and TRP B (e.g., using different layers), if TRP A receives a NACK, then TRP A cannot determine whether the NACK was due to an unsuccessful transmission of the codeword by TRP A or by TRP B. In this case, TRP B would also receive a NACK, and TRP B would also be unable to determine whether the NACK was due to an unsuccessful transmission of the codeword by TRP A or by TRP B. In this case, each TRP may count a NACK corresponding to a joint codeword transmission as a fractional NACK value to determine whether a condition for adjusting a contention window size, for that TRP, is satisfied.

In example 600, if TRP A and TRP B each receive a NACK corresponding to the codeword, then TRP A may increment a NACK counter for TRP A by 0.5 rather than by 1, and TRP B may increment a NACK counter for TRP B by 0.5 rather than by 1. As described above in connection with FIG. 5, the NACK counter may be used to determine a percentage of NACKs in a reference time window. For a NACK corresponding to a non-joint codeword transmission (e.g., an independent codeword transmission), TRP A and TRP B may increment respective NACK counters by 1. After incrementing respective NACK counters and determining respective percentages of NACKs associated with a reference time window (e.g., a reference subframe), TRP A and TRP B may adjust a contention window size if a threshold percentage (e.g., 80%) of NACKs are received in association with the reference time window, in a similar manner as described above in connection with FIG. 5. By using a fractional NACK value when the TRPs are unable to determine which PDSCH communication was unsuccessful, the TRPs may obtain a more accurate representation of respective congestion levels for contention window size adjustment.

In some aspects, TRP A and TRP B may use independent reference time windows to determine whether a condition for contention window size adjustment is satisfied. For example, TRP A may use a first reference time window and TRP B may use a second (e.g., potentially different) reference time window. In some aspects, the joint ACK/NACK information transmitted by the UE 120 may occur in the first reference time window but not the second reference time window. In this case, TRP A may increment a NACK counter using a fractional NACK value as described above, whereas TRP B may not use this NACK to increment a NACK counter.

In some aspects, the UE 120 may transmit, to TRP A, information regarding a quality of a link between the UE 120 and TRP B. For example, the UE 120 may transmit an indication of whether a grant was received from TRP B, an indication of whether downlink control information (DCI), transmitted by TRP B, was detected by the UE 120, an indication of whether the first PDSCH communication and the second PDSCH communication overlap (e.g., in time and/or frequency), and/or the like. In some aspects, TRP A may adjust the contention window size based at least in part on the information regarding the quality of the link between the UE 120 and TRP B.

For example, if the information indicates a poor link quality between the UE 120 and TRP B, then TRP A may refrain from increasing a size of a contention window and/or may modify a procedure for contention window size adjustment to reduce the likelihood of increasing the contention window size (e.g., by increasing a threshold percentage of NACKs from, for example, 80% to 90% or 95%). In this case, the NACKs may be due to the poor link quality and not to congestion associated with TRP A, so TRP A may configure the contention window size to more accurately reflect congestion by taking into account the link quality between the UE 120 and TRP B. Additionally, or alternatively, TRP A and TRP B may deactivate a multi-TRP transmission mode and/or a joint transmission mode (e.g., where TRP A and TRP B transmit different layers of the same codeword) based at least in part on the information regarding the link quality, thereby improving network performance. Additionally, or alternatively, TRP A and/or TRP B may adjust one or more transmission parameters based at least in part on the link quality, such as a modulation and coding scheme (MCS), a transport block (TB) size, a resource allocation (e.g., a number of resources blocks (RBs)), and/or the like.

As indicated above, FIG. 6 is provided as an example. Other examples may differ from what is described with respect to FIG. 6.

Figure 7:
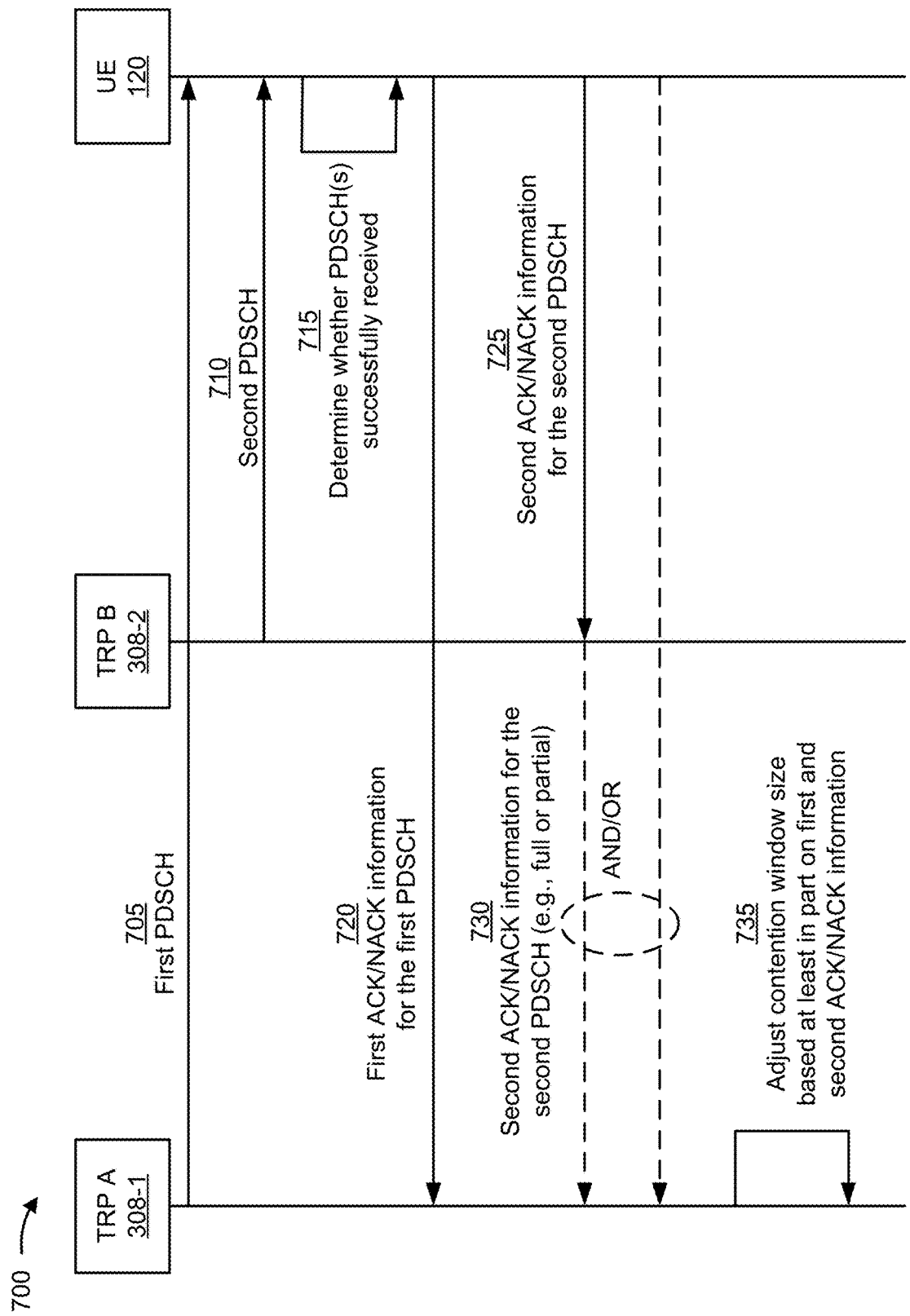
FIG. 7 is a diagram illustrating another example of contention window adjustment for multiple transmit receive points, in accordance with various aspects of the present disclosure.

FIG. 7 is a diagram illustrating another example 700 of contention window adjustment for multiple transmit receive points, in accordance with various aspects of the present disclosure. As shown in FIG. 7, a UE 120 may communicate with a first TRP 308-1 (shown as TRP A) and a second TRP 308-2 (shown as TRP B). One or both of the first TRP 308-1 and the second TRP 308-2 may be a TRP 308 described above in connection with FIG. 3 and/or may be deployed in a base station 110 described above in connection with FIG. 1 (e.g., the same base station 110 or different base stations 110).

As shown by reference number 705, TRP A may transmit a first PDSCH communication to the UE 120. As shown by reference number 710, TRP B may transmit a second PDSCH communication to the UE 120. As described above in connection with FIG. 6, in some aspects, the first PDSCH communication includes a first set of layers for a codeword, and the second PDSCH communication includes a second set of layers for the codeword (the same codeword).

Alternatively, in some aspects, the first PDSCH communication includes a first set of layers for a first codeword and the second PDSCH communication includes a second set of layers for a second (e.g., different) codeword. For example, TRP A and TRP B may communicate with the UE 120 in a first multi-TRP transmission mode (e.g., Mode 1), where a single PDCCH is used to schedule downlink data communications for a single PDSCH. In this case, TRP A and TRP B may transmit communications to the UE 120 on the same PDSCH. For example, TRP A and TRP B transmit respective PDSCH communications using multiple codewords, where different codewords are transmitted by different TRPs 308 (e.g., using different sets of layers).

As shown by reference number 715, the UE 120 may determine whether the PDSCH communications were successfully received, in a similar manner as described above in connection with FIG. 6. If the first PDSCH communication and the second PDSCH communication correspond to the same codeword, then the UE 120 may generate joint ACK/NACK information for the first PDSCH communication and the second PDSCH communication, as described above in connection with FIG. 6. If the first PDSCH communication and the second PDSCH communication correspond to different codewords, then the UE 120 may generate independent ACK/NACK information for the first PDSCH communication and the second PDSCH communication. In this case, the UE 120 may generate first ACK/NACK information and second ACK/NACK information that may potentially be different. For example, the first ACK/NACK information may include an ACK if the first PDSCH communication (e.g., the first codeword) is successfully received, and the second ACK/NACK information may include a NACK if the second PDSCH communication (e.g., the second codeword) is not successfully received.

As shown by reference number 720, the UE 120 may transmit first ACK/NACK information corresponding to the codeword to TRP A. Similarly, as shown by reference number 725, the UE 120 may transmit second ACK/NACK information corresponding to the codeword to TRP B. If the first PDSCH communication and the second PDSCH communication correspond to the same codeword, then the UE 120 may transmit the first ACK/NACK information and the second ACK/NACK information as joint ACK/NACK information (e.g., the first ACK/NACK information and the second ACK/NACK information may be the same), as described above in connection with FIG. 6. If the first PDSCH communication and the second PDSCH communication correspond to different codewords, then the first ACK/NACK information and the second ACK/NACK information may be different.

As shown by reference number 730, in some aspects, the UE 120 may transmit the second ACK/NACK information, corresponding to TRP B, to TRP A. This direct transmission from the UE 120 to TRP A may reduce latency and lead to faster adjustment of the contention window size to reflect network congestion as compared to an indirect transmission, described below. Additionally, or alternatively, TRP B may transmit the second ACK/NACK information, received from the UE 120, to TRP A (e.g., via a wired link or a wireless link). This indirect transmission form TRP B to TRP A may conserve wireless network resources (e.g., when a wired backhaul link is used) as compared to the direct transmission. As described below, in some aspects, TRP A may use both the first ACK/NACK information and the second ACK/NACK information to determine whether to adjust a contention window size. In some aspects, the second ACK/NACK information transmitted to and/or used by TRP A may include all of the ACK/NACK information transmitted by the UE 120 to TRP B in connection with the second PDSCH communication.

Alternatively, the second ACK/NACK information transmitted to and/or used by TRP A may be a subset of the ACK/NACK information transmitted by the UE 120 to TRP B in connection with the second PDSCH communication. Additionally, or alternatively, the second ACK/NACK information transmitted to and/or used by TRP A may be a compressed version of the ACK/NACK information transmitted by the UE 120 to TRP B in connection with the second PDSCH communication. In these cases, the second ACK/NACK information transmitted to and/or used by TRP A may include fewer bits than the ACK/NACK information transmitted by the UE 120 to TRP B in connection with the second PDSCH communication, thereby reducing signaling overhead.

In some aspects, TRP A may receive second ACK/NACK information, corresponding to PDSCH transmissions by TRP B, less frequently than first ACK/NACK information corresponding to PDSCH transmissions by TRP A, thereby reducing signaling overhead. For example, TRP A may transmit, to the UE 120 and/or to TRP B, an instruction regarding whether to report the second ACK/NACK information, a periodicity of reporting the second ACK/NACK information (which may be larger than a periodicity of reporting the first ACK/NACK information), a time period for which the second ACK/NACK information is to be reported (e.g., a reference time window for the second ACK/NACK information), and/or the like. As an example, TRP A may instruct the UE 120 to report second ACK/NACK information for a time period used by TRP A for a reference time window for TRP A (e.g., a reference time window used for the first ACK/NACK information). Additionally, or alternatively, TRP A may activate or deactivate transmission of the second ACK/NACK information to TRP A (e.g., using a signaling message, such as DCI, activation DCI, an explicit DCI bit, a combination of values in DCI fields, and/or the like).

In some aspects, the second ACK/NACK information may be reported to TRP A using a semi-static codebook regardless of a codebook type configured for TRP B. In some aspects, the second ACK/NACK information may be reported to TRP A using a codebook with a fixed size. For example, TRP A may configure a fixed length codebook for the second ACK/NACK information, and the UE 120 may puncture ACK/NACK information corresponding to the second PDSCH if the ACK/NACK information is larger than the fixed size, or the UE 120 may pad the ACK/NACK information if the ACK/NACK information is smaller than the fixed size. In some aspects, the second ACK/NACK information may be reported to TRP A using a codebook with a variable size that is indicated to TRP A by the UE 120. For example, the UE 120 may transmit a two-stage physical uplink control channel (PUCCH) communication, where the first stage indicates a payload size for the ACK/NACK information and the second stage indicates the second ACK/NACK information. In any of these cases, the first ACK/NACK information may be reported to TRP A using a codebook configured by TRP A (e.g., for the UE 120).

As shown by reference number 735, TRP A may adjust a contention window size (e.g., for a contention window of an LAA procedure) based at least in part on the first ACK/NACK information and the second ACK/NACK information. For example, TRP A may adjust the contention window size based at least in part on a determination that a condition, associated with the first ACK/NACK information and the second ACK/NACK information, is satisfied. If the first ACK/NACK information and the second ACK/NACK information are generated as joint ACK/NACK information that indicates a NACK, then TRP A may count the NACK as a fractional NACK value to determine whether the condition is satisfied, as described above in connection with FIG. 6.

As described above, in some aspects, the first ACK/NACK information and the second ACK/NACK information are generated independently (e.g., when the first and second PDSCH communications carry different codewords). In this case, in some aspects, TRP A may use only the first ACK/NACK information (corresponding to the first PDSCH communication transmitted by TRP A) and not the second ACK/NACK information to determine whether to adjust the contention window size for TRP A. Alternatively, TRP A may use both the first ACK/NACK information and the second ACK/NACK information to determine whether to adjust the contention window size for TRP A.

In some aspects, TRP A and TRP B may use independent reference time windows to determine whether a condition for contention window size adjustment is satisfied, as described above in connection with FIG. 6. In some aspects, TRP A may count second ACK/NACK information for contention window size adjustment only if the second ACK/NACK information is received in a reference time window configured for TRP A. Thus, in some cases, when a first reference time window of TRP A is different than a second reference time window of TRP B, ACK/NACK information may be counted for one of the TRPs and not the other TRP in connection with adjustments by those TRPs of respective contention windows.

In some aspects, TRP A may receive (e.g., from TRP B) information that identifies the second reference time window configured for TRP B. In this case, TRP A may use both the first reference time window and the second reference time window to determine whether to adjust a contention window size. For example, TRP A may use first ACK/NACK feedback (and not second ACK/NACK feedback) received in the first reference time window and may use second ACK/NACK feedback (and not first ACK/NACK feedback) received in the second reference time window to determine whether to adjust a contention window size. In this case, to calculate the threshold percentage of NACKs, TRP A may consider NACKs included in ACK/NACK information received in the second reference time window as well as a total number of ACKs and NACKs included in ACK/NACK information received in the second reference time window.

In some aspects, the UE 120 may transmit, to TRP A, information regarding a quality of a link between the UE 120 and TRP B. For example, the UE 120 may transmit an indication of whether a grant was received from TRP B, an indication of whether downlink control information (DCI), transmitted by TRP B, was detected by the UE 120, an indication of whether the first PDSCH communication and the second PDSCH communication overlap (e.g., in time and/or frequency), and/or the like. In some aspects, TRP A may adjust the contention window size based at least in part on the information regarding the quality of the link between the UE 120 and TRP B.

Although techniques are described above in connection with TRP A using information regarding TRP B to adjust the size of a contention window of TRP A, TRP B may also use information regarding TRP A to adjust the size of a contention window of TRP B. In this way, contention window adjustment in a multi-TRP scenario may be improved.

As indicated above, FIG. 7 is provided as an example. Other examples may differ from what is described with respect to FIG. 7.

FIG. 8 is a diagram illustrating an example process 800 performed, for example, by a TRP (e.g., a first TRP), in accordance with various aspects of the present disclosure. Example process 800 is an example where a TRP (e.g., TRP 308, first TRP 308-1, second TRP 308-2, base station 110, and/or the like) performs operations associated with contention window adjustment for multiple transmit receive points.

As shown in FIG. 8, in some aspects, process 800 may include transmitting a first PDSCH communication to a UE, wherein the first PDSCH communication includes a first set of layers for a codeword, and wherein a second set of layers for the codeword are transmitted to the UE in a second PDSCH communication from a second TRP (block 810). For example, the first TRP (e.g., using transmit processor 220, controller/processor 240, memory 242, and/or the like) may transmit a first PDSCH communication to a user equipment (UE, as described above. In some aspects, the first PDSCH communication includes a first set of layers for a codeword. In some aspects, a second set of layers for the codeword are transmitted to the UE in a second PDSCH communication from a second TRP.

As further shown in FIG. 8, in some aspects, process 800 may include receiving, from the UE, ACK/NACK information corresponding to the codeword (block 820). For example, the first TRP (e.g., using receive processor 238, controller/processor 240, memory 242, and/or the like) may receive, from the UE, ACK/NACK information corresponding to the codeword, as described above.

As further shown in FIG. 8, in some aspects, process 800 may include adjusting a contention window size based at least in part on a determination that a condition, associated with the ACK/NACK information, is satisfied (block 830). For example, the first TRP (e.g., using controller/processor 240, memory 242, and/or the like) may adjust a contention window size based at least in part on a determination that a condition, associated with the ACK/NACK information, is satisfied, as described above.

Process 800 may include additional aspects, such as any single aspect or any combination of aspects described below and/or in connection with one or more other processes described elsewhere herein.

In a first aspect, the ACK/NACK information includes a negative acknowledgement (NACK), and the first TRP is configured to count the NACK as a fractional NACK value to determine whether the condition is satisfied.

In a second aspect, alone or in combination with the first aspect, the condition is that a threshold percentage of NACKs are received in a reference time window, and the first TRP is configured to increment a NACK counter using the fractional NACK value to determine whether the condition is satisfied.

In a third aspect, alone or in combination with one or more of the first and second aspects, the reference time window used by the first TRP is different from a reference time window used by the second TRP.

In a fourth aspect, alone or in combination with one or more of the first through third aspects, process 800 includes determining whether the condition is satisfied based at least in part on additional ACK/NACK information received from the second TRP in association with the UE.

In a fifth aspect, alone or in combination with one or more of the first through fourth aspects, process 800 includes receiving, from the UE, information regarding a quality of a link between the UE and the second TRP; and adjusting the contention window size further based at least in part on the information regarding the quality of the link between the UE and the second TRP.

In a sixth aspect, alone or in combination with one or more of the first through fifth aspects, the contention window size is associated with a licensed-assisted access procedure.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a UE, in accordance with various aspects of the present disclosure. Example process 900 is an example where a UE (e.g., UE 120 and/or the like) performs operations associated with contention window adjustment for multiple transmit receive points.

As shown in FIG. 9, in some aspects, process 900 may include determining that a first PDSCH communication from a first TRP was not successfully received by the UE, wherein the first PDSCH communication from the first TRP includes a first set of layers for a codeword and a second PDSCH communication from a second TRP includes a second set of layers for the codeword (block 910). For example, the UE (e.g., using receive processor 258, controller/processor 280, memory 282, and/or the like) may determine that a first PDSCH communication from a first TRP was not successfully received by the UE, as described above. In some aspects, the first PDSCH communication from the first TRP includes a first set of layers for a codeword and a second PDSCH communication from a second TRP includes a second set of layers for the codeword.

As further shown in FIG. 9, in some aspects, process 900 may include transmitting ACK/NACK information corresponding to the codeword to both the first TRP and the second TRP based at least in part on determining that the first PDSCH communication was not successfully received by the UE (block 920). For example, the UE (e.g., using transmit processor 264, controller/processor 280, memory 282, and/or the like) may transmit ACK/NACK information corresponding to the codeword to both the first TRP and the second TRP based at least in part on determining that the first PDSCH communication was not successfully received by the UE, as described above.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a TRP (e.g., a first TRP), in accordance with various aspects of the present disclosure. Example process 1000 is an example where a TRP (e.g., TRP 308, first TRP 308-1, second TRP 308-2, base station 110, and/or the like) performs operations associated with contention window adjustment for multiple transmit receive points.

As shown in FIG. 10, in some aspects, process 1000 may include transmitting a first PDSCH communication to a UE (block 1010). For example, the first TRP (e.g., using transmit processor 220, controller/processor 240, memory 242, and/or the like) may transmit a first PDSCH communication to a UE, as described above.

As further shown in FIG. 10, in some aspects, process 1000 may include receiving, from the UE, first ACK/NACK information corresponding to the first PDSCH communication (block 1020). For example, the first TRP (e.g., using receive processor 238, controller/processor 240, memory 242, and/or the like) may receive, from the UE, first ACK/NACK information corresponding to the first PDSCH communication, as described above.

As further shown in FIG. 10, in some aspects, process 1000 may include receiving second ACK/NACK information corresponding to a second PDSCH communication transmitted to the UE from a second TRP (block 1030). For example, the first TRP (e.g., using receive processor 238, controller/processor 240, memory 242, and/or the like) may receive second ACK/NACK information corresponding to a second PDSCH communication transmitted to the UE from a second TRP, as described above.

As further shown in FIG. 10, in some aspects, process 1000 may include adjusting a contention window size based at least in part on a determination that a condition, associated with the first ACK/NACK information and the second ACK/NACK information, is satisfied (block 1040). For example, the first TRP (e.g., using controller/processor 240, memory 242, and/or the like) may adjust a contention window size based at least in part on a determination that a condition, associated with the first ACK/NACK information and the second ACK/NACK information, is satisfied, as described above.

Process 1000 may include additional aspects, such as any single aspect or any combination of aspects described below and/or in connection with one or more other processes described elsewhere herein.

In a first aspect, the first PDSCH communication includes a first set of layers for a codeword, the second PDSCH communication includes a second set of layers for the codeword, and the first ACK/NACK information and the second ACK/NACK information are joint ACK/NACK information corresponding to the codeword.

In a second aspect, alone or in combination with the first aspect, the joint ACK/NACK information includes a NACK, and the first TRP is configured to count the NACK as a fractional NACK value to determine whether the condition is satisfied.

In a third aspect, alone or in combination with one or more of the first and second aspects, the condition is that a threshold percentage of NACKs are received in a reference time window, and the first TRP is configured to increment a NACK counter using the fractional NACK value to determine whether the condition is satisfied.

In a fourth aspect, alone or in combination with one or more of the first through third aspects, a first reference time window used by the first TRP is different from a second reference time window used by the second TRP.

In a fifth aspect, alone or in combination with one or more of the first through fourth aspects, process 1000 includes receiving information regarding a quality of a link between the UE and the second TRP; and adjusting the contention window size further based at least in part on the information regarding the quality of the link between the UE and the second TRP.

In a sixth aspect, alone or in combination with one or more of the first through fifth aspects, the information regarding the quality of the link includes at least one of: demodulation reference signal (DMRS)-based signal-to-interference-plus-noise ratio (SINR) information, an indication of whether a grant was received from the second TRP, an indication of whether downlink control information, transmitted by the second TRP, was detected by the UE, an indication of whether the first PDSCH communication and the second PDSCH communication overlap, or a combination thereof.

In a seventh aspect, alone or in combination with one or more of the first through sixth aspects, the second ACK/NACK information is a subset of ACK/NACK information transmitted by the UE to the second TRP in connection with the second PDSCH communication.

In an eighth aspect, alone or in combination with one or more of the first through seventh aspects, process 1000 includes transmitting, to the UE, an instruction regarding at least one of: whether to report the second ACK/NACK information, a periodicity of reporting the second ACK/NACK information, a time period for which the second ACK/NACK information is to be reported, or a combination thereof.

In a ninth aspect, alone or in combination with one or more of the first through eighth aspects, ACK/NACK information associated with the second TRP is received less frequently than ACK/NACK information associated with the first TRP.

In a tenth aspect, alone or in combination with one or more of the first through ninth aspects, the second ACK/NACK information is reported using a semi-static codebook regardless of a codebook type configured for the second TRP.

In an eleventh aspect, alone or in combination with one or more of the first through tenth aspects, the second ACK/NACK information is reported using a codebook with a fixed size.

In a twelfth aspect, alone or in combination with one or more of the first through eleventh aspects, the second ACK/NACK information is reported using a codebook with a variable size that is indicated to the first TRP by the UE.

In a thirteenth aspect, alone or in combination with one or more of the first through twelfth aspects, the second ACK/NACK information is received from at least one of the UE or the second TRP.

In a fourteenth aspect, alone or in combination with one or more of the first through thirteenth aspects, the first PDSCH communication includes a first set of layers for a first codeword and the second PDSCH communication includes a second set of layers for a second codeword.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first transmit receive point (TRP), comprising:
    transmitting a first physical downlink shared channel (PDSCH) communication to a user equipment (UE), wherein the first PDSCH communication includes a first set of layers for a codeword, and wherein a second set of layers for the codeword are transmitted to the UE in a second PDSCH communication from a second TRP;
    receiving, from the UE, acknowledgement or negative acknowledgement (ACK/NACK) information corresponding to the codeword; and
    adjusting a contention window size based at least in part on a determination that a condition, associated with the ACK/NACK information, is satisfied, wherein the condition is that a threshold percentage of negative acknowledgements (NACKs) are received in a reference time window, and wherein the first TRP is configured to increment a negative acknowledgement (NACK) counter using a fractional NACK value to determine whether the condition is satisfied.

2. The method of claim 1, wherein the ACK/NACK information includes a NACK, and wherein the first TRP is configured to count the NACK as the fractional NACK value to determine whether the condition is satisfied.

3. The method of claim 1, wherein the reference time window used by the first TRP is different from a reference time window used by the second TRP.

4. The method of claim 1, further comprising determining whether the condition is satisfied based at least in part on additional ACK/NACK information received from the second TRP in association with the UE.

5. The method of claim 1, further comprising:
    receiving, from the UE, information regarding a quality of a link between the UE and the second TRP; and
    adjusting the contention window size further based at least in part on the information regarding the quality of the link between the UE and the second TRP.

6. The method of claim 1, wherein the contention window size is associated with a licensed-assisted access procedure.

7. A method of wireless communication performed by a first transmit receive point (TRP), comprising:
    transmitting a first physical downlink shared channel (PDSCH) communication to a user equipment (UE);
    receiving, from the UE, first acknowledgement or negative acknowledgement (ACK/NACK) information corresponding to the first PDSCH communication;
    receiving second ACK/NACK information corresponding to a second PDSCH communication transmitted to the UE from a second TRP; and
    adjusting a contention window size based at least in part on a determination that a condition, associated with the first ACK/NACK information and the second ACK/NACK information, is satisfied, wherein the condition is that a threshold percentage of negative acknowledgements (NACKs) are received in a reference time window, and wherein the first TRP is configured to increment a negative acknowledgement (NACK) counter using a fractional NACK value to determine whether the condition is satisfied.

8. The method of claim 7, wherein the first PDSCH communication includes a first set of layers for a codeword, the second PDSCH communication includes a second set of layers for the codeword, and the first ACK/NACK information and the second ACK/NACK information are joint ACK/NACK information corresponding to the codeword.

9. The method of claim 8, wherein the joint ACK/NACK information includes a NACK, and wherein the first TRP is configured to count the NACK as the fractional NACK value to determine whether the condition is satisfied.

10. The method of claim 7, wherein a first reference time window used by the first TRP is different from a second reference time window used by the second TRP, and wherein the reference time window is one of the first reference time window or the second reference time window.

11. The method of claim 7, further comprising:
    receiving information regarding a quality of a link between the UE and the second TRP; and
    adjusting the contention window size further based at least in part on the information regarding the quality of the link between the UE and the second TRP.

12. The method of claim 11, wherein the information regarding the quality of the link includes at least one of:
    demodulation reference signal (DMRS)-based signal-to-interference-plus-noise ratio (SINR) information,
    an indication of whether a grant was received from the second TRP,
    an indication of whether downlink control information, transmitted by the second TRP, was detected by the UE,
    an indication of whether the first PDSCH communication and the second PDSCH communication overlap, or
    a combination thereof.

13. The method of claim 7, wherein the second ACK/NACK information is a subset of ACK/NACK information transmitted by the UE to the second TRP in connection with the second PDSCH communication.

14. The method of claim 7, further comprising transmitting, to the UE, an instruction regarding at least one of:
    whether to report the second ACK/NACK information,
    a periodicity of reporting the second ACK/NACK information,
    a time period for which the second ACK/NACK information is to be reported, or
    a combination thereof.

15. The method of claim 7, wherein ACK/NACK information associated with the second TRP is received less frequently than ACK/NACK information associated with the first TRP.

16. The method of claim 7, wherein the second ACK/NACK information is reported using a semi-static codebook regardless of a codebook type configured for the second TRP.

17. The method of claim 7, wherein the second ACK/NACK information is reported using a codebook with a fixed size.

18. The method of claim 7, wherein the second ACK/NACK information is reported using a codebook with a variable size that is indicated to the first TRP by the UE.

19. The method of claim 7, wherein the second ACK/NACK information is received from at least one of the UE or the second TRP.

20. The method of claim 7, wherein the first PDSCH communication includes a first set of layers for a first codeword and the second PDSCH communication includes a second set of layers for a second codeword.

21. A first transmit receive point (TRP) for wireless communication, comprising:

a memory; and one or more processors operatively coupled to the memory, the one or more processors configured to:

transmit a first physical downlink shared channel (PDSCH) communication to a user equipment (UE), wherein the first PDSCH communication includes a first set of layers for a codeword, and wherein a second set of layers for the codeword are transmitted in a second PDSCH communication from a second TRP;

receive, from the UE, acknowledgement or negative acknowledgement (ACK/NACK) information corresponding to the codeword; and adjust a contention window size based at least in part on a determination that a condition, associated with the ACK/NACK information, is satisfied, wherein the condition is that a threshold percentage of negative acknowledgements (NACKs) are received in a reference time window, and wherein the first TRP is configured to increment a negative acknowledgement (NACK) counter using a fractional NACK value to determine whether the condition is satisfied.

22. The first TRP of claim 21, wherein the ACK/NACK information includes a NACK, and wherein the first TRP is configured to count the NACK as the fractional NACK value to determine whether the condition is satisfied.

23. The first TRP of claim 21, wherein the reference time window is used by the first TRP and is different from a reference time window used by the second TRP.

24. The first TRP of claim 21, wherein the one or more processors are further configured to determine whether the condition is satisfied based at least in part on additional ACK/NACK information received from the second TRP in association with the UE.

25. The first TRP of claim 21, wherein the one or more processors are further configured to:

receive, from the UE, information regarding a quality of a link between the UE and the second TRP; and adjust the contention window size further based at least in part on the information regarding the quality of the link between the UE and the second TRP.

26. The first TRP of claim 21, wherein the contention window size is associated with a licensed-assisted access procedure.

27. A first transmit receive point (TRP) for wireless communication, comprising:

a memory; and one or more processors operatively coupled to the memory, the one or more processors configured to:

transmit a first physical downlink shared channel (PDSCH) communication to a user equipment (UE);

receive, from the UE, first acknowledgement or negative acknowledgement (ACK/NACK) information corresponding to the first PDSCH communication;

receive second ACK/NACK information corresponding to a second PDSCH communication transmitted to the UE from a second TRP; and adjust a contention window size based at least in part on a determination that a condition, associated with the first ACK/NACK information and the second ACK/NACK information, is satisfied, wherein the condition is that a threshold percentage of negative acknowledgements (NACKs) are received in a reference time window, and wherein the first TRP is configured to increment a negative acknowledgement (NACK) counter using a fractional NACK value to determine whether the condition is satisfied.

28. The first TRP of claim 27, wherein the first PDSCH communication includes a first set of layers for a codeword, the second PDSCH communication includes a second set of layers for the codeword, and the first ACK/NACK information and the second ACK/NACK information are joint ACK/NACK information corresponding to the codeword.

29. The first TRP of claim 28, wherein the joint ACK/NACK information includes a NACK, and wherein the first TRP is configured to count the NACK as the fractional NACK value to determine whether the condition is satisfied.

30. The first TRP of claim 27, wherein a first reference time window used by the first TRP is different from a second reference time window used by the second TRP, and wherein the reference time window is one of the first reference time window or the second reference time window.

31. The first TRP of claim 27, wherein the second ACK/NACK information is a subset of ACK/NACK information transmitted by the UE to the second TRP in connection with the second PDSCH communication.

* * * * *